(12) United States Patent
Yonekura et al.

(10) Patent No.: US 10,465,622 B2
(45) Date of Patent: Nov. 5, 2019

(54) ENGINE CONTROL METHOD AND CONTROL DEVICE

(71) Applicants: NISSAN MOTOR CO., LTD., Yokohama-shi, Kanagawa (JP); RENAULT S. A. S., Boulogne-Billancourt (FR)

(72) Inventors: Kengo Yonekura, Kanagawa (JP); Hirofumi Tsuchida, Kanagawa (JP); Takayuki Hamamoto, Kanagawa (JP)

(73) Assignees: NISSAN MOTOR CO., LTD., Yokohama-shi (JP); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 16/330,934

(22) PCT Filed: Sep. 7, 2016

(86) PCT No.: PCT/JP2016/076238
§ 371 (c)(1),
(2) Date: Mar. 6, 2019

(87) PCT Pub. No.: WO2018/047248
PCT Pub. Date: Mar. 15, 2018

(65) Prior Publication Data
US 2019/0234328 A1 Aug. 1, 2019

(51) Int. Cl.
*F02D 41/02* (2006.01)
*F02D 41/14* (2006.01)
*F02D 41/00* (2006.01)

(52) U.S. Cl.
CPC ....... *F02D 41/021* (2013.01); *F02D 41/0077* (2013.01); *F02D 41/145* (2013.01)

(58) Field of Classification Search
CPC ... F02D 41/021; F02D 41/0077; F02D 41/145
See application file for complete search history.

(56) References Cited

U.S. PATENT DOCUMENTS 5,918,582 A * 7/1999 Itoyama .............. F02D 41/0007
123/480
6,405,122 B1 * 6/2002 Yamaguchi ......... F02D 41/1404
701/106

(Continued)

FOREIGN PATENT DOCUMENTS

JP 2012-251509 A 12/2012
JP 2013-24175 A 2/2013

(Continued)

*Primary Examiner* — Hung Q Nguyen
(74) *Attorney, Agent, or Firm* — Foley & Lardner LLP

(57) ABSTRACT

A basic opening (A0) of an EGR control valve (22) is set, based on a current engine operation state. A differential pressure (ΔP1) across the EGR control valve (22) is calculated, based on an actual exhaust system temperature (T1) sensed by an exhaust temperature sensor (33). A reference differential pressure (ΔP0) is calculated, which is a differential pressure across the EGR control valve (22) in a steady state corresponding to the current engine operation state. A reference pulsation amplitude (D) is calculated, which is an amplitude of pulsation of the reference differential pressure (ΔP0). The basic opening (A0) is corrected, based on the differential pressure (ΔP1), the reference differential pressure (ΔP0), and the reference pulsation amplitude (D).

10 Claims, 10 Drawing Sheets

(56) References Cited

U.S. PATENT DOCUMENTS

| | | | |
|---|---|---|---|
| 9,091,223 | B2 | 7/2015 | Tsuyuki |
| 2002/0011101 | A1* | 1/2002 | Hartke ...................... F01L 9/04 73/114.78 |

FOREIGN PATENT DOCUMENTS

| | | |
|---|---|---|
| JP | 5420489 B2 | 2/2014 |
| JP | 2014-95303 A | 5/2014 |
| JP | 2016-56802 A | 4/2016 |
| JP | 2016-89784 A | 5/2016 |

* cited by examiner

FIG. 3

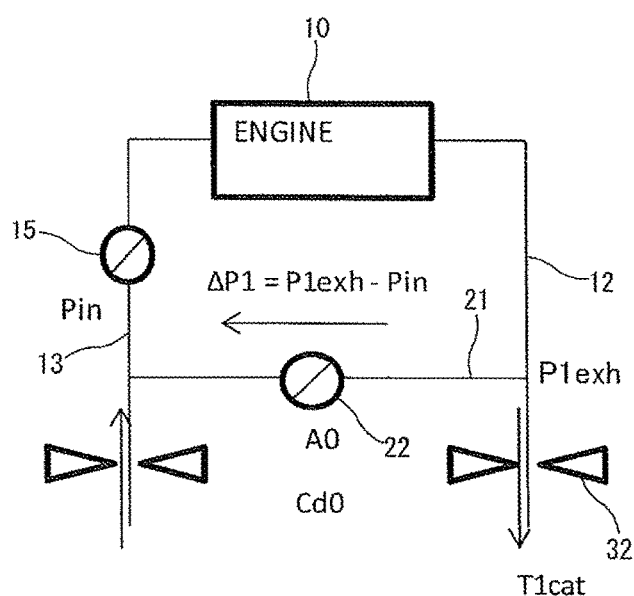

| | STEADY STATE | STATE OF THERMAL NON-EQUILIBRIUM |
|---|---|---|
| PRESSURE UPSTREAM OF EGR CONTROL VALVE | P0exh | P1exh |
| PRESSURE DOWNSTREAM OF EGR CONTROL VALVE | Pin | Pin |
| DIFFERENTIAL PRESSURE ACROSS EGR CONTROL VALVE | ΔP0 | ΔP1 |
| CONCENTRATION OF EXHAUST GAS UPSTREAM OF EGR CONTROL VALVE | ρ0exh | ρ1exh |
| CONCENTRATION OF EXHAUST GAS IN EGR PASSAGE | ρ0 | |
| EXHAUST SYSTEM TEMPERATURE | T0 | T1 |
| TEMPERATURE DOWNSTREAM OF DOWNSTREAM CATALYST | T0cat | T1cat |

| | STEADY STATE | STATE OF THERMAL NON-EQUILIBRIUM |
|---|---|---|
| FLOW RATE OF EGR GAS PASSING THROUGH EGR PASSAGE | Q0 | Q1 |
| FLOW RATE COEFFICIENT OF EGR CONTROL VALVE | Cd0 | Cd1 |
| OPENING AREA OF EGR CONTROL VALVE | A0 | A1 |
| FLOW SPEED OF EGR GAS AT EGR CONTROL VALVE | v0 | v1 |
| CONCENTRATION OF EXHAUST GAS UPSTREAM OF EGR CONTROL VALVE | ρ0exh | ρ1exh |
| DIFFERENTIAL PRESSURE ACROSS EGR CONTROL VALVE | ΔP0 | ΔP1 |

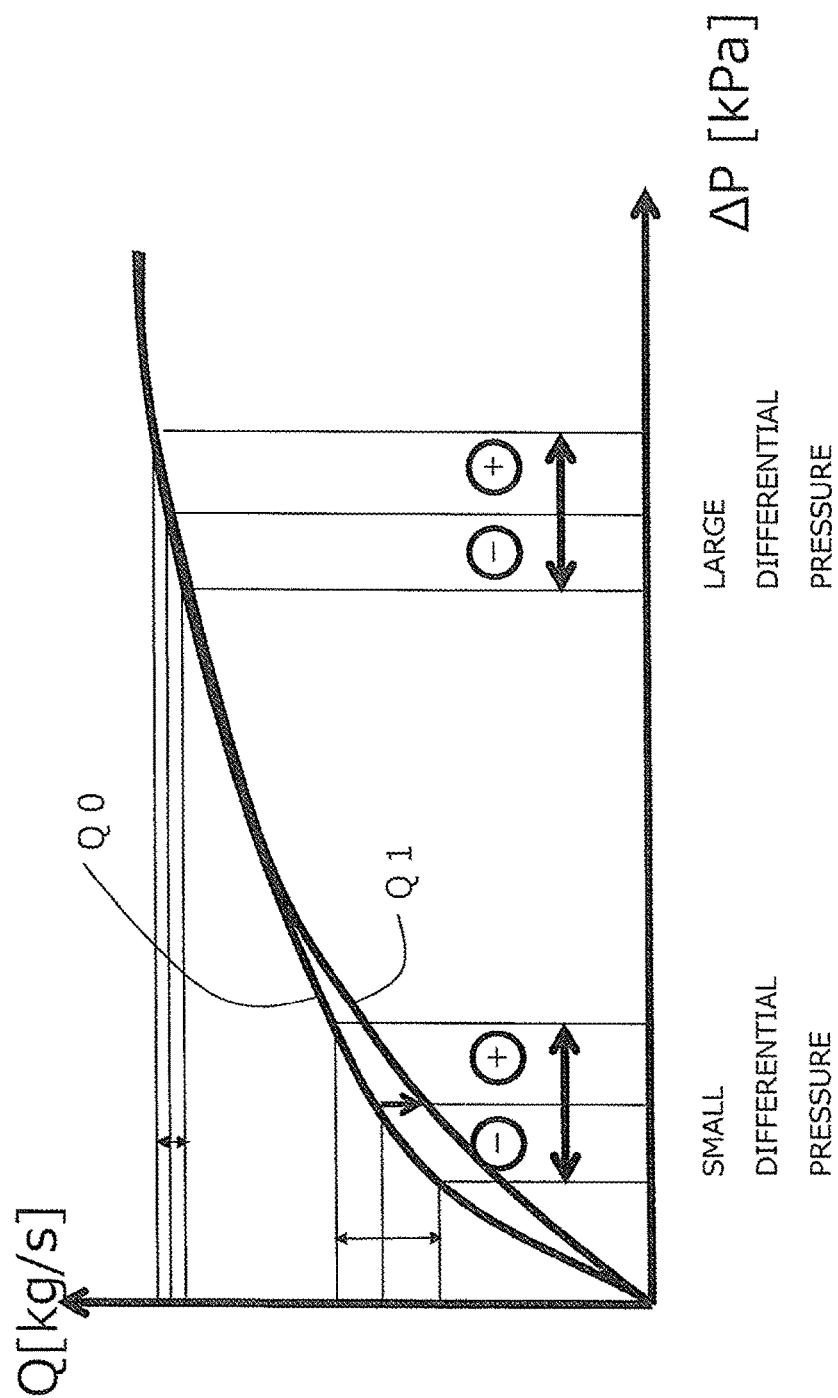

AT ACCELERATION

AT DECELERATION

ENGINE CONTROL METHOD AND CONTROL DEVICE

TECHNICAL FIELD

The present invention relates to control of an engine including an EGR device for recirculating a part of exhaust gas into intake air, and particularly to an art for correcting an opening (opening degree) of an EGR control valve.

BACKGROUND ART

A patent document 1 discloses an art for an EGR (Exhaust Gas Recirculation) device of an engine for recirculating a part of exhaust gas into intake air, wherein accuracy of estimation of a flow rate of EGR gas is enhanced by calculation taking account of pulsation of the EGR gas. Specifically, for the EGR device, it is configured to: employ sensors to sense pressures at upstream and downstream sides of an EGR valve provided in an EGR passage; make a conversion into a sine wave from fluctuations in pressure ratio during a predetermined time period; calculate a pressure function, based on the sine wave, wherein the pressure function is used to calculate the flow rate of EGR gas from a pressure ratio as a variable; and calculate the flow rate of EGR gas flowing in the EGR passage during the predetermined time period, by using the pressure function.

PRIOR ART DOCUMENT(S)

Patent Document(s)

Patent Document 1: Japanese Patent No. 5420489

SUMMARY OF INVENTION

Problem(s) to be Solved by Invention

If the conventional art described above is used to obtain characteristics of pulsation of EGR gas by using the pressure sensors, and correct an opening of the EGR control valve based on the obtained characteristics, there is a problem that highly responsive pressure sensors have greater errors and lower accuracy.

The present invention has been made with attention to the problem described above, and is targeted for accurately correcting the opening of the EGR control valve.

Means for Solving Problem(s)

According to the present invention, an engine control method comprises: opening and closing an EGR passage by an EGR control valve, wherein the EGR passage is configured to recirculate a part of exhaust gas from an exhaust passage to an intake passage; setting a basic opening of the EGR control valve, based on a current engine operation state; sensing an actual exhaust system temperature that is a current temperature of an exhaust system; calculating a differential pressure across the EGR control valve, based on the actual exhaust system temperature; calculating a reference differential pressure that is a differential pressure across the EGR control valve in a steady state corresponding to the current engine operation state; calculating a reference pulsation amplitude that is an amplitude of pulsation of the reference differential pressure; and correcting the basic opening, based on the differential pressure, the reference differential pressure, and the reference pulsation amplitude.

Effect(s) of Invention

According to the present invention, the feature of correcting the opening of the EGR control valve, depending on the differential pressure based on the actual exhaust system temperature, the reference differential pressure corresponding to the current engine operation state, and the reference pulsation amplitude, serves to suppress variation of the flow rate of EGR gas from being caused by a transient change of the exhaust system temperature, and thereby enhance accuracy of the correction of the opening of the EGR control valve.

BRIEF DESCRIPTION OF DRAWINGS

FIG. 3 is an illustrative diagram illustrating an assumption where an intake-exhaust system is equivalent to a system composed of orifices in terms of fluid dynamics.

FIG. 6 is an illustrative diagram illustrating variation of the flow rate of EGR gas caused by pulsation of a differential pressure across the EGR control valve.

FIG. 7A is a characteristic diagram showing changes of an EGR rate at acceleration, whereas

MODE(S) FOR CARRYING OUT INVENTION

Figure 1:
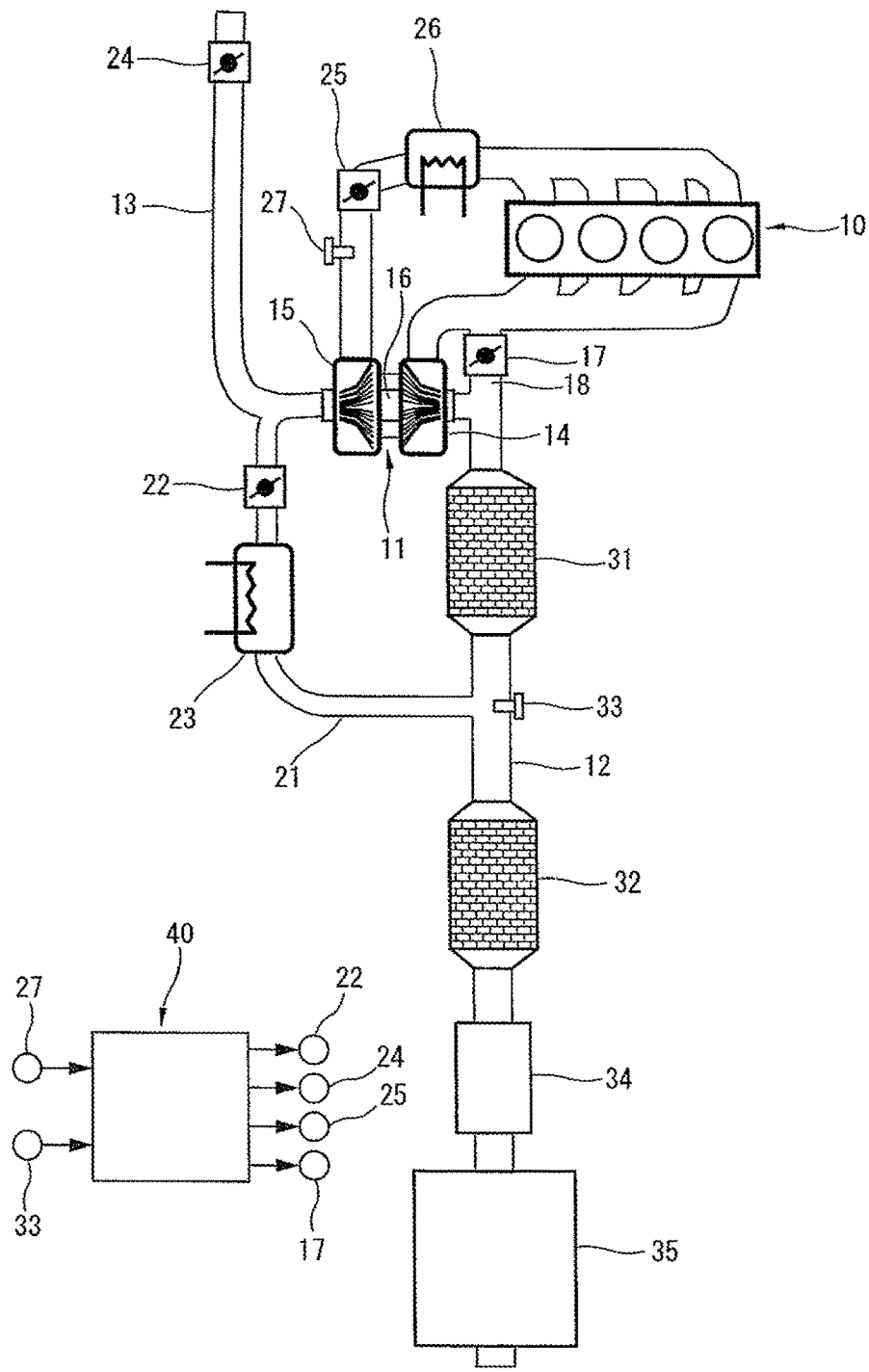
FIG. 1 is a configuration diagram showing an example of engine including an EGR device, according to the present invention.

The following describes engine control device and engine control method according to the present invention with reference to embodiments shown in the drawings. FIG. 1 is a configuration diagram schematically showing an example of engine including an EGR device, according to a first embodiment of the present invention.

An engine 10 includes a turbocharger 11. Turbocharger 11 includes a turbine 14, a compressor 15, and a common shaft 16, wherein turbine 14 is disposed in an exhaust passage 12, and compressor 15 is disposed in an intake passage 13, and turbine 14 and compressor 15 are coaxially arranged on shaft 16. A flow of exhaust gas drives turbine 14 rotationally, to rotate compressor 15, thereby pressurizing and supercharging intake air. Exhaust passage 12 is provided with a bypass passage 18 that bypasses turbine 14. Bypass passage 18 is provided with a wastegate valve 17 for regulation of boost pressure.

Engine 10 further includes an EGR (Exhaust Gas Recirculation) device for recirculating a part of EGR gas into intake air. The EGR device includes an EGR passage 21 connecting the exhaust passage 12 to intake passage 13, wherein an EGR gas as a part of exhaust gas is recirculated from exhaust passage 12 to intake passage 13 through EGR passage 21. EGR passage 21 is provided with an EGR control valve 22 and an EGR cooler 23. EGR control valve 22 is configured to open and close the EGR passage 21, and thereby control a flow rate of the EGR gas flowing in EGR passage 21, and thereby control an EGR rate (ratio of a quantity of EGR gas with respect to a quantity of intake fresh air). EGR cooler 23 is configured to cool the EGR gas.

The EGR device is a so-called low-pressure type EGR device where a confluence where EGR passage 21 meets intake passage 13 is arranged upstream of compressor 15. An intake air flow rate regulation valve 24 is provided in a part of intake passage 13 upstream of the confluence of EGR passage 21, for regulating the quantity of intake fresh air.

A throttle valve 25 is disposed in a part of intake passage 13 downstream of compressor 15, and is configured to be electronically controlled to open and close the intake passage 13. An intercooler 26 is disposed in a part of intake passage 13 downstream of throttle valve 25, and is configured to cool intake air including intake fresh air and the EGR gas introduced through the EGR passage. Moreover, an oxygen concentration sensor 27 is disposed in a part of intake passage 13 downstream of compressor 15 and upstream of throttle valve 25, and is configured to sense the concentration of oxygen in intake air.

Of throttle valve 25 and intake air flow rate regulation valve 24, control of the intake air quantity is performed basically by throttle valve 25. However, when in an EGR operation region for introducing the EGR gas into intake passage 13, intake air flow rate regulation valve 24 is controlled in a closing direction so as to suppress the quantity of intake fresh air.

Exhaust passage 12 is provided with an upstream catalyst 31 and a downstream catalyst 32, wherein upstream catalyst 31 is disposed upstream of a place connected to EGR passage 21, and downstream catalyst 32 is disposed downstream of the place connected to EGR passage 21. An exhaust gas temperature sensor 33 is disposed in vicinity to the place connected to EGR passage 21, and configured to serve as an exhaust system temperature sensing part to sense a current temperature of an exhaust system.

An auxiliary muffler 34 and a main muffler 35 as silencers are arranged in series in a part of exhaust passage 12 downstream of downstream catalyst 32.

A control section 40 is configured to output control signals to wastegate valve 17, EGR control valve 22, intake air quantity regulation valve 24, throttle valve 25, etc., to control their operations, based on sensing signals from various sensors such as oxygen concentration sensor 27 and exhaust gas temperature sensor 33.

Figure 2:
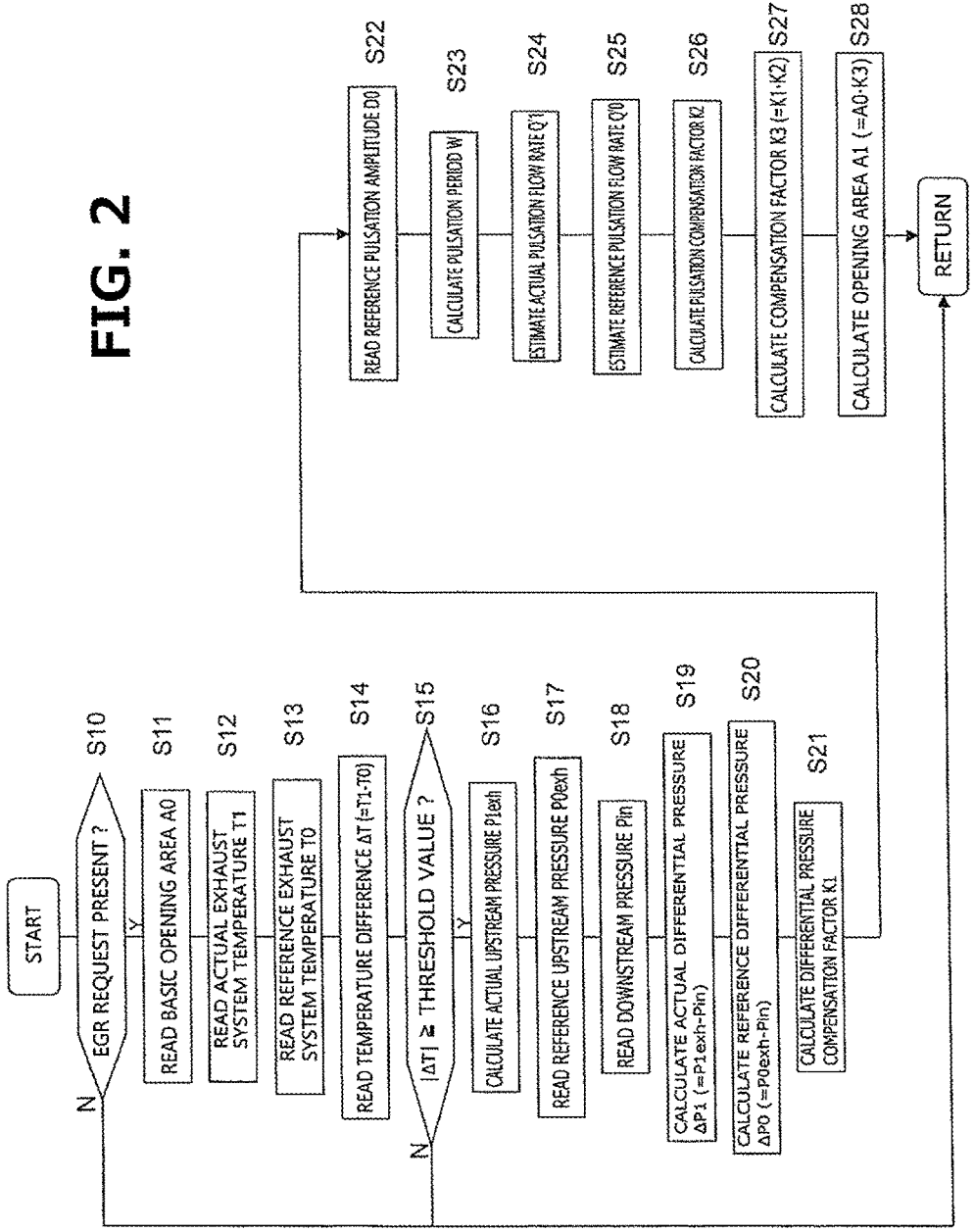
FIG. 2 is a flow chart showing a flow of control for correcting an opening area of an EGR control valve, according to a first embodiment of the present embodiment.

FIG. 2 is a flow chart showing a flow of control for correcting an opening area of EGR control valve 22, wherein the opening area of EGR control valve 22 corresponds to an opening (opening degree) of EGR control valve 22. This routine is executed repeatedly by control section 40 at intervals of a predetermined very short time period (10 ms, for example). Although the present embodiment is configured to correct the opening area of EGR control valve 22, it may be configured to correct the opening (opening degree) itself of EGR control valve 22. In the present embodiment, the term "pressure" basically means an average of pressure fluctuating, namely, a central value of oscillation of pressure.

At Step S10, control section 40 determines whether or not an EGR request is present, namely, whether or not it is in an EGR operation region where the EGR gas is recirculated to intake passage 13. For example, this determination is based on engine rotational speed and engine load with reference to a prepared map for EGR operation region setting. For enhancement of fuel efficiency, the EGR operation region is set wide so as to include a partial load region.

At Step S11, control section 40 serves as a basic opening area setting part to set and read a basic opening area A0 of EGR control valve 22 corresponding to a basic opening (opening degree) of EGR control valve 22, wherein the basic opening area A0 is set based on engine rotational speed and engine load with reference to a prepared map for opening area setting. The basic opening area A0 is set to achieve a target EGR rate (ratio of the flow rate of EGR gas flow rate with respect to the intake air quantity) corresponding to a current state of engine rotational speed and engine load.

At Step S12, control section 40 determines and reads an actual exhaust system temperature T1, based on the sensing signal from exhaust gas temperature sensor 33, wherein the actual exhaust system temperature T1 is an actual temperature of the exhaust system. At Step S13, control section 40 determines and reads a reference exhaust system temperature T0 with reference to a prepared map for reference exhaust system temperature setting for each state of engine rotational speed and engine load, wherein the reference exhaust system temperature T0 is a temperature of the exhaust system in a steady state corresponding to the current state of engine rotational speed and engine load. At Step S14, control section 40 calculates a temperature difference $\Delta T$ between actual exhaust system temperature T1 and reference exhaust system temperature T0.

At Step S15, control section 40 determines whether or not temperature difference $\Delta T$ has an absolute value greater than or equal to a predetermined threshold value. When the absolute value of temperature difference $\Delta T$ is smaller than the predetermined threshold value, control section 40 determines that it is in a steady state where actual exhaust system temperature T1 is close to reference exhaust system temperature T0, and variation of the opening area (opening) of EGR control valve 22 due to non-equilibrium of the exhaust system temperature is small, and therefore terminates the present routine without correction of the opening area of EGR control valve 22.

Accordingly, the opening of EGR control valve 22 is controlled based on basic opening area A0 calculated at Step S11.

On the other hand, when the absolute value of temperature difference $\Delta T$ is greater than or equal to the predetermined threshold value, control section 40 determines that it is in a state of thermal non-equilibrium where actual exhaust system temperature T1 is apart from reference exhaust system temperature T0, and variation of the opening area (opening) of EGR control valve 22 due to non-equilibrium of the exhaust system temperature is large, and therefore proceeds to Step S16 and the following where a correcting operation is performed for the opening area of EGR control valve 22.

First, at Step S16, control section 40 calculates an actual upstream pressure P1exh, based on actual exhaust system temperature T1, wherein actual upstream pressure P1exh is a current pressure at an upstream side of EGR control valve 22. A specific example of this calculation is described below. At Step S17, control section 40 determines and reads a reference upstream pressure P0exh, based on the current engine rotational speed and engine load with reference to a prepared map for reference upstream pressure setting, wherein reference upstream pressure P0exh is a pressure at the upstream side of EGR control valve 22 in the steady state.

At Step S18, control section 40 determines and reads a downstream pressure Pin, based on the current engine rotational speed and engine load with reference to a prepared map for downstream pressure setting, wherein downstream pressure Pin is a pressure at a downstream side of EGR control valve 22.

At Step S19, control section 40 serves as a differential pressure calculating part to calculate and read a differential pressure ΔP1, based on actual upstream pressure P1exh and downstream pressure Pin, wherein differential pressure ΔP1 corresponds to a differential pressure across the EGR control valve 22. Specifically, downstream pressure Pin is subtracted from actual upstream pressure P1exh, to obtain differential pressure $$\Delta P1 (= P1\text{exh} - P\text{in}).$$

At Step S20, control section 40 serves as a reference differential pressure calculating part to calculate and read a reference differential pressure ΔP0, based on reference upstream pressure P0exh and downstream pressure Pin, wherein reference differential pressure ΔP0 corresponds to a differential pressure across the EGR control valve 22 in the steady state. Specifically, downstream pressure Pin is subtracted from reference upstream pressure P0exh, to obtain reference differential pressure ΔP0.

At Step S21, control section 40 calculates a differential pressure compensation factor K1 for the opening area of EGR control valve 22, based on differential pressure ΔP1 and reference differential pressure ΔP0. A specific example of calculation of differential pressure compensation factor K1 is described below.

At Step S22, control section 40 serves as a reference pulsation amplitude calculating part to determine and read a reference pulsation amplitude D0, based on the engine rotational speed and engine load with reference to a prepared map for reference pulsation amplitude setting, wherein reference pulsation amplitude D0 is an amplitude of pulsation of a differential pressure across EGR control valve 22 in the steady state, namely, an amplitude of pulsation of the reference differential pressure. At Step S23, control section 40 calculates a pulsation period W of reference differential pressure ΔP0, based on the engine rotational speed and engine load.

At Step S24, control section 40 estimates an actual pulsation flow rate Q'1, based on pulsation period W, reference pulsation amplitude D0, and differential pressure ΔP1, wherein actual pulsation flow rate Q'1 is a flow rate of pulsation in consideration of pulsation of differential pressure ΔP1, and corresponds to a mass flow rate of EGR gas per period of pulsation of differential pressure ΔP1. At Step S25, control section 40 estimates a reference pulsation flow rate Q'0, based on pulsation period W, reference pulsation amplitude D0, and reference differential pressure ΔP0, wherein reference pulsation flow rate Q'0 is a flow rate of pulsation in consideration of pulsation of reference differential pressure ΔP0, and corresponds to a mass flow rate of EGR gas per period of pulsation of reference differential pressure ΔP0.

At Step S26, control section 40 serves as a pulsation compensation factor calculating part to calculate a pulsation compensation factor K2 for basic opening area A0 of EGR control valve 22 such that actual pulsation flow rate Q'1 becomes equal to reference pulsation flow rate Q'0. A specific example of this calculation is described below with reference to FIG. 5.

The contents of Steps S24 and S25 are not necessarily for actual application to the engine, but are for explanation with actual pulsation flow rate Q'1 and reference pulsation flow rate Q'0, for easy understanding about a theory for obtaining the pulsation compensation factor K2.

At Step S27, control section 40 calculates an overall compensation factor K3 for basic opening area A0 of EGR control valve 22, based on differential pressure compensation factor K1 and pulsation compensation factor K2. Specifically, overall compensation factor K3 is obtained by multiplying the differential pressure compensation factor K1 and pulsation compensation factor K2 together.

At Step S28, control section 40 serves as a correcting part to correct the basic opening area A0 of EGR control valve 22 by using the overall compensation factor K3. Specifically, control section 40 obtains a final opening area A1 of EGR control valve 22 by multiplying the basic opening area A0 by overall compensation factor K3. When Step S16 and the following steps are executed, control section 40 controls the opening of EGR control valve 22, based on the final opening area A1.

Figure 4:
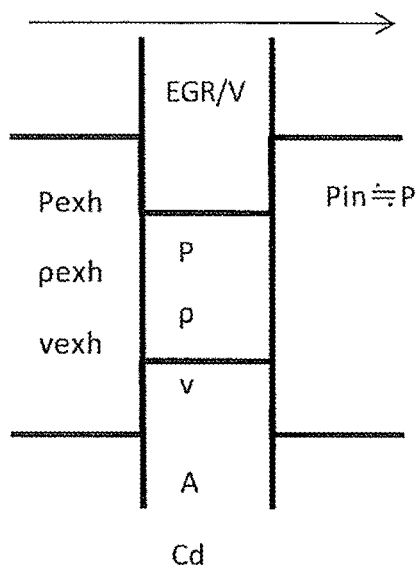
FIG. 4 is an illustrative diagram illustrating an example of calculation of a differential pressure compensation factor.
Figure 5:
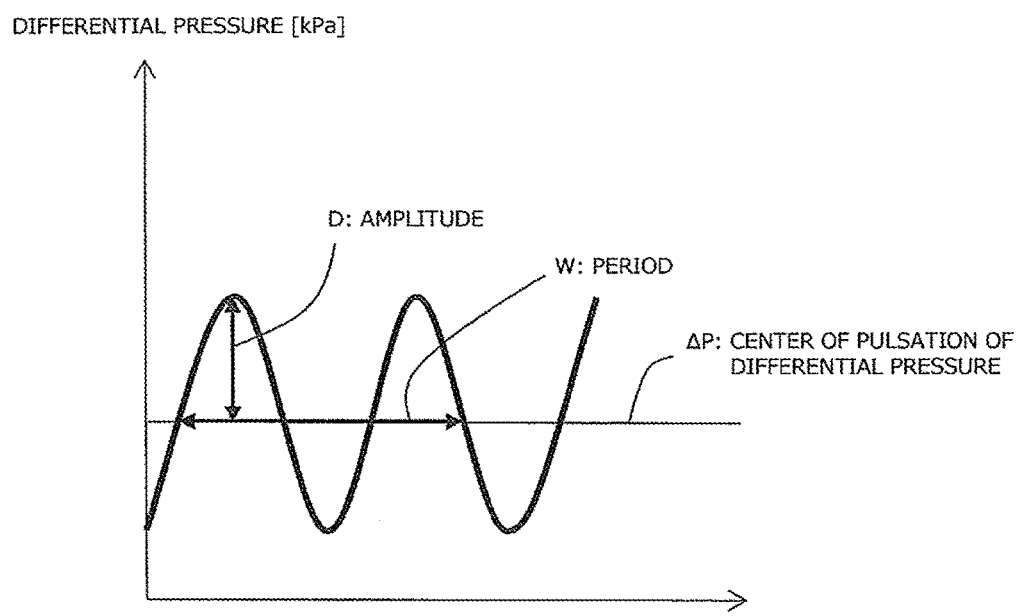
FIG. 5 is an illustrative diagram illustrating an example of calculation of a pulsation compensation factor.

In FIGS. 3 to 5, each reference sign including "0" indicates a parameter in the steady state at reference exhaust system temperature T0, whereas each reference sign including "1" indicates a parameter in a state of thermal non-equilibrium where actual exhaust system temperature T1 is apart by the predetermined value or more from reference exhaust system temperature T0.

The following describes an example of calculation of actual upstream pressure P1exh at Step S16 with reference to FIG. 3. On the assumption that the intake-exhaust system is equivalent to a system composed of orifices, the concentration of exhaust gas upstream of EGR control valve 22 is expressed by the following equations for the steady state and for the state of thermal non-equilibrium.

$$\rho 0\text{exh} = \rho 0 \times T0/(T0 + T0\text{cat})$$

$$\rho 1\text{exh} = \rho 0 \times T0/(T0 + T1\text{cat})$$

An actual exhaust system temperature T1cat at a downstream side of downstream catalyst 32 is obtained from actual exhaust system temperature T1. Accordingly, actual upstream pressure P1exh is expressed by the following equation.

$$P1\text{exh} = P0\text{exh} \times \rho 0\text{exh}/\rho 1\text{exh}$$

Next, the following describes an example of calculation of differential pressure compensation factor K1 at Step S21 with reference to FIG. 4. On the assumption that the intake-exhaust system is equivalent to a system composed of orifices, the Bernoulli equation is as follows.

$$\tfrac{1}{2} \times \rho 0\text{exh} \times v0\text{exh}^2 + P0\text{exh} = \tfrac{1}{2} \times \rho 0 \times v0^2 + P0$$

On the assumption that the flow speed upstream of EGR control valve 22 is equal to zero, the following equation is derived.

$$P0\text{exh} = \tfrac{1}{2} \times \rho 0 \times v0^2 + P0$$

$$\tfrac{1}{2} \times \rho 0 \times v0^2 = P0\text{exh} - P0$$

$$v0 = \{2 \times (P0\text{exh} - P0)/\rho 0\}^{1/2} \quad (1)$$

The equation of continuation is as follows.

$$Q0 = \rho 0 \times Cd0 \times A0 \times v0 \; [\text{kg/s}]$$

Substituting the equation (1) yields the following equation.

$$Q0 = Cd0 \times A0 \times \{2 \times \rho 0 \times (P0exh - P0)\}^{1/2}$$

Substituting P0≈Pin yields the following equation.

$$Q0 = Cd0 \times A0 \times \{2 \times \rho 0 \times (P0exh - Pin)\}^{1/2}$$

With $\Delta P = P0exh - Pin$, the flow rate of EGR gas passing through the EGR passage 21 in the steady state is expressed by the following equation.

$$Q0 = Cd0 \times A0 \times (2 \times \rho 0 \times \Delta P0)^{1/2}$$

Similarly, the flow rate of EGR gas in the state of thermal non-equilibrium is expressed by the following equation.

$$Q1 = Cd1 \times A1 \times (2 \times \rho 1 \times \Delta P1)^{1/2}$$

In order to achieve $Q0 = Q1$, the following equation is derived.

$$Cd0 \times A0 \times (2 \times \rho 0 \times \Delta P0)^{1/2} = Cd1 \times A1 \times (2 \times \rho 1 \times \Delta P1)^{1/2}$$

With $Cd0 \approx Cd1$ assumed, the following equation is derived.

$$A0 \times (2 \times \rho 0 \times \Delta P0)^{1/2} = A1 \times (2 \times \rho 1 \times \Delta P1)^{1/2}$$

$$A1 = A0 \times \{(\rho 0 \times \Delta P0)/(\rho 1 \times \Delta P1)\}^{1/2}$$

Therefore, differential pressure compensation factor K1 is expressed by the following equation.

$$K1 = \{(\rho 0 \times \Delta P0)/(\rho 1 \times \Delta P1)\}^{1/2} \quad (2)$$

With $\rho 0 \approx \rho 1$ for simple calculation, differential pressure compensation factor K1 is expressed by the following equation.

$$K1 = (\Delta P0 / \Delta P1)^{1/2} \quad (2)'$$

Next, the following describes an example of calculation of pulsation compensation factor K2 at Step S26 with reference to FIG. 5. On the assumption that EGR control valve 22 is equivalent to a system composed of an orifice, the flow rate of EGR gas flowing in EGR passage 21, namely, the mas flow rate passing through EGR control valve 22, Q, is expressed by the following equation.

$$Q = Cd \times A \times (2 \times \rho \times \Delta P)^{1/2}$$

where Q: the mass flow rate of EGR gas [kg/s],
Cd: the flow rate coefficient of the EGR control valve [-],
ρ: the concentration of EGR gas [kg/m³], and
ΔP: the differential pressure across the EGR control valve [kPa].

With $C = Cd \times (2 \times \rho)^{1/2}$, the following equation is derived.

$$Q = C \times A \times \Delta P^{1/2}$$

Under influence of pulsation of exhaust gas introduced into EGR passage 21, differential pressure ΔP across EGR control valve 22 also pulsates. As the pulsation of differential pressure ΔP is converted into a sine wave, and the amplitude of the pulsation is represented by D, actual pulsation flow rate Q', which is an average mass flow rate of EGR gas per period of pulsation of the differential pressure, is expressed by the following equation.

$$Q' = 1/W \times \int \{A \times C \times (\Delta P + D \times \sin(\omega t))^{1/2}\} dt$$

where ΔP: (the center of oscillation of) the differential pressure across EGR control valve [kPa],
D: the pulsation amplitude of the differential pressure [kPa], and
ω: the angular speed of pulsation (=2n/W) [rad/sec].

Accordingly, as Q'1 is an actual pulsation flow rate of differential pressure ΔP1 in the state of thermal non-equilibrium, and Q'0 is a reference pulsation flow rate of reference differential pressure ΔP0 in the steady state, the following equation is derived.

$$Q'1 = 1/W \times \int \{A1 \times C \times (\Delta P1 + D1 \times \sin(\omega t))^{1/2}\} dt \quad (3)$$

$$Q'0 = 1/W \times \int \{A0 \times C \times (\Delta P0 + D0 \times \sin(\omega t))^{1/2}\} dt \quad (4)$$

In order to set the actual pulsation flow rate Q'1 equal to reference pulsation flow rate Q'0 by correction of basic opening area A0 of EGR control valve 22, the following equation is derived.

$$1/w \times \int \{A1 \times C \times (\Delta P1 + D1 \times \sin(\omega t))^{1/2}\} dt = 1/W \times \int \{A0 \times C \times (\Delta P0 + D0 \times \sin(\omega t))^{1/2}\} dt$$

Hence, opening area A1 of the EGR control valve for Q'1=Q'0 is expressed by the following equation.

$$A1 = [\int\{(\Delta P0 + D0 \times \sin(\omega t))^{1/2}\} dt / \int\{(\Delta P1 + D1 \times \sin(\omega t))^{1/2}\} dt] \times A0$$

Therefore, pulsation compensation factor K2 for Q'1=Q'0 is expressed by the following equation.

$$K2 = [\int\{(\Delta P0 + D0 \times \sin(\omega t))^{1/2}\} dt / \int\{(\Delta P1 + D1 \times \sin(\omega t))^{1/2}\} dt] \quad (5)$$

In second and third embodiments described below, an actual pulsation amplitude D1 for pulsation of the differential pressure is calculated, for which the equations (3) to (5) are used. However, in the first embodiment, the value of reference pulsation amplitude D0 is used for simple estimation of actual pulsation amplitude D1, so that the equations (3) and (5) are converted into the following equations (3)' and (5)'.

$$Q'1 = 1/W \times \int \{A1 \times C \times (\Delta P1 + D1 \times \sin(\omega t))^{1/2}\} dt \quad (3)'$$

$$K2 = [\int\{(\Delta P0 + D0 \times \sin(\omega t))^{1/2}\} dt / \int\{(\Delta P1 + D0 \times \sin(\omega t))^{1/2}\} dt] \quad (5)'$$

In this way, the present embodiment is configured to calculate the differential pressure ΔP1 at actual exhaust system temperature T1 and the reference differential pressure ΔP0 at reference exhaust system temperature T0, and correct the basic opening area A0 of EGR control valve 22 by differential pressure compensation factor K1 in consideration of these differential pressures, and pulsation compensation factor K2 in consideration of pulsation of the differential pressure. This serves to accurately correct the basic opening area A0 of EGR control valve 22, even in the state of thermal non-equilibrium where the exhaust system temperature changes rapidly, for example, at acceleration or deceleration. The feature that differential pressure compensation factor K1 and pulsation compensation factor K2 are obtained without use of pressure sensors, serves to prevent adverse effects of errors of the pressure sensors.

FIG. 6 shows a relationship between the flow rate Q of EGR gas and pulsation of differential pressure ΔP in the state of thermal non-equilibrium. As shown in FIG. 6, in a nonlinear region where differential pressure ΔP is small, even if the "+" side amplitude and "−" side amplitude of the pulsation are symmetrical, actual flow rate Q1 of EGR gas at actual exhaust system temperature T1 deviates to the minus side from reference flow rate Q0. Accordingly, it is required to correct the basic opening area A0 of EGR control valve 22 in the increasing direction. On the other hand, in a linear region where differential pressure ΔP is large, if the "+" side amplitude and "−" side amplitude of the pulsation are symmetrical, actual flow rate Q1 deviates little from reference flow rate Q0. Accordingly, it is not required to correct the basic opening area A0. In this way, in the state of thermal non-equilibrium, actual flow rate Q1 deviates from reference flow rate Q0 in this specific manner under influence of pulsation of the differential pressure, but the feature of the present embodiment that pulsation compensation factor K2 is calculated to set the actual pulsation flow rate Q'1 equal to reference pulsation flow rate Q'0, and basic opening area A0 is corrected by using the pulsation compensation factor K2, serves to suppress variation of the flow rate of EGR gas from being caused by pulsation of the differential pressure in the state of thermal non-equilibrium, and thereby accurately correct the opening area A1 of EGR control valve 22.

Figure 7A:
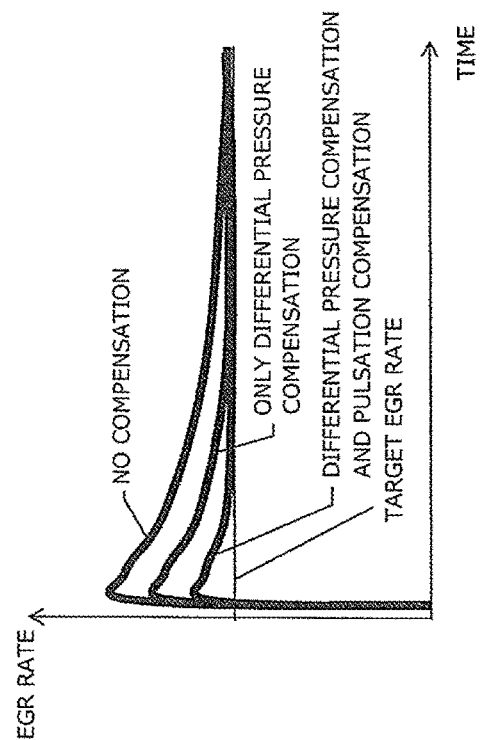

FIG. 7A shows changes of the EGR rate of EGR control valve 22 at acceleration. At acceleration, especially, at an initial stage of acceleration, delay of rise of the exhaust system temperature with respect to rise of the engine rotational speed and engine load causes actual exhaust system temperature T1 to be transiently lower than reference exhaust system temperature T0. Accordingly, without the correction according to the present embodiment, especially at an initial stage of acceleration, the opening area of EGR control valve 22 tends to become relatively small so that the actual EGR rate is lower than the target EGR rate. In contrast, with the correction based on differential pressure compensation factor K1 described above, at an initial stage of acceleration where the exhaust system temperature is in a state of thermal non-equilibrium, the opening area is corrected in the increasing direction so that the actual EGR rate increases and gets close to the target EGR rate. Furthermore, with the correction based on both of differential pressure compensation factor K1 and pulsation compensation factor K2 according to the present embodiment, at an initial stage of acceleration where the exhaust system temperature is in a state of thermal non-equilibrium, the opening area is further corrected in the increasing direction so that the actual EGR rate further increases and gets more close to the target EGR rate.

Figure 7B:
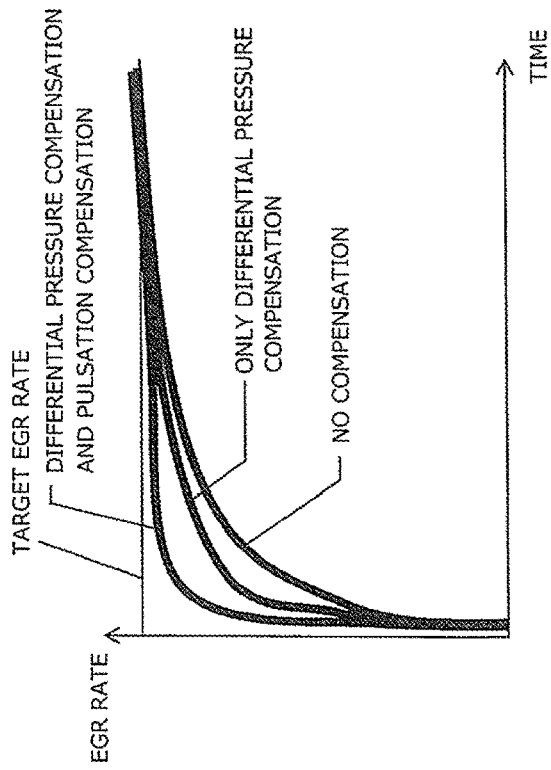
FIG. 7B is a characteristic diagram showing changes of the EGR rate at deceleration.

FIG. 7B shows changes of the EGR rate of EGR control valve 22 at deceleration. At deceleration, especially, at an initial stage of deceleration, delay of fall of the exhaust system temperature with respect to fall of the engine rotational speed and engine load causes actual exhaust system temperature T1 to be transiently higher than reference exhaust system temperature T0.

Accordingly, without the correction according to the present embodiment, especially at an initial stage of deceleration, the opening area of EGR control valve 22 tends to become relatively large so that the actual EGR rate is higher than the target EGR rate. In contrast, with the correction based on differential pressure compensation factor K1 described above, at an initial stage of deceleration where the exhaust system temperature is in a state of thermal non-equilibrium, the opening area is corrected in the decreasing direction so that the actual EGR rate decreases and gets close to the target EGR rate. Furthermore, with the correction based on both of differential pressure compensation factor K1 and pulsation compensation factor K2 according to the present embodiment, at an initial stage of deceleration where the exhaust system temperature is in a state of thermal non-equilibrium, the opening area is further corrected in the decreasing direction so that the actual EGR rate further decreases and gets closer to the target EGR rate.

Embodiments described below are based on the first embodiment. The following describes features different from the first embodiment, with redundant description omitted.

Figure 8:
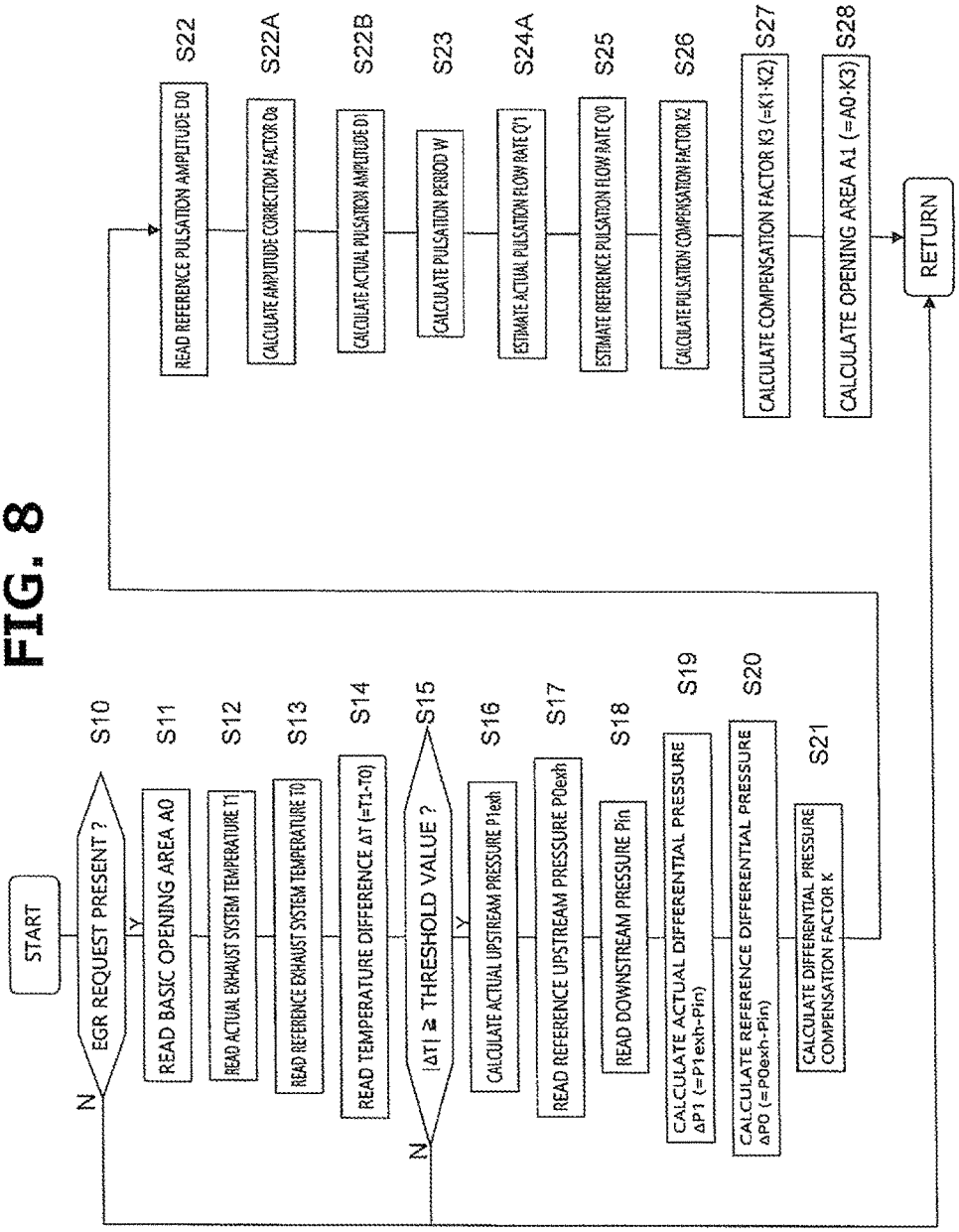
FIG. 8 is a flow chart showing a flow of control for correcting the opening of the EGR control valve, according to a second embodiment of the present embodiment.

FIG. 8 is a flow chart showing a flow of control for correcting the basic opening area A0 of EGR control valve 22, according to a second embodiment of the present embodiment. For further enhancement of accuracy of the correction, the second embodiment is configured to calculate an actual pulsation amplitude D1 by correcting the reference pulsation amplitude D0 based on temperature difference $\Delta T$, and calculate actual pulsation flow rate Q'1 and pulsation compensation factor K2 by using the actual pulsation amplitude D1, as shown in equations (3) and (5).

Specifically, with reference to the flow chart of FIG. 8, the operations of Steps S10 to S22 are the same as in the first embodiment. Subsequent to Step S22, at Step S22A, control section 40 calculates an amplitude correction factor Da for reference pulsation amplitude D0, based on temperature difference $\Delta T$ between actual exhaust system temperature T1 and reference exhaust system temperature T0. Subsequently, at Step S22B, control section 40 calculates actual pulsation amplitude D1 at the current actual exhaust system temperature T1, based on reference pulsation amplitude D0 and amplitude correction factor Da. Specifically, the actual pulsation amplitude D1 is obtained by multiplying the reference pulsation amplitude D0 by amplitude correction factor Da. At Step S23, control section 40 calculates pulsation period W of the differential pressure as in the first embodiment. At Step S24A, control section 40 calculates actual pulsation flow rate Q'1 of EGR gas passing through EGR passage 21, based on pulsation period W, actual pulsation amplitude D1, and differential pressure $\Delta P1$. The operations of the following Steps S25 to S28 are the same as in the first embodiment.

According to the second embodiment described above, the feature of calculating the actual pulsation amplitude D1 at actual exhaust system temperature T1, and calculating the actual pulsation flow rate Q'1 and pulsation compensation factor K2 at actual exhaust system temperature T1 by using the actual pulsation amplitude D1, serves to further enhance the accuracy of the correction as compared to the first embodiment.

Figure 9:
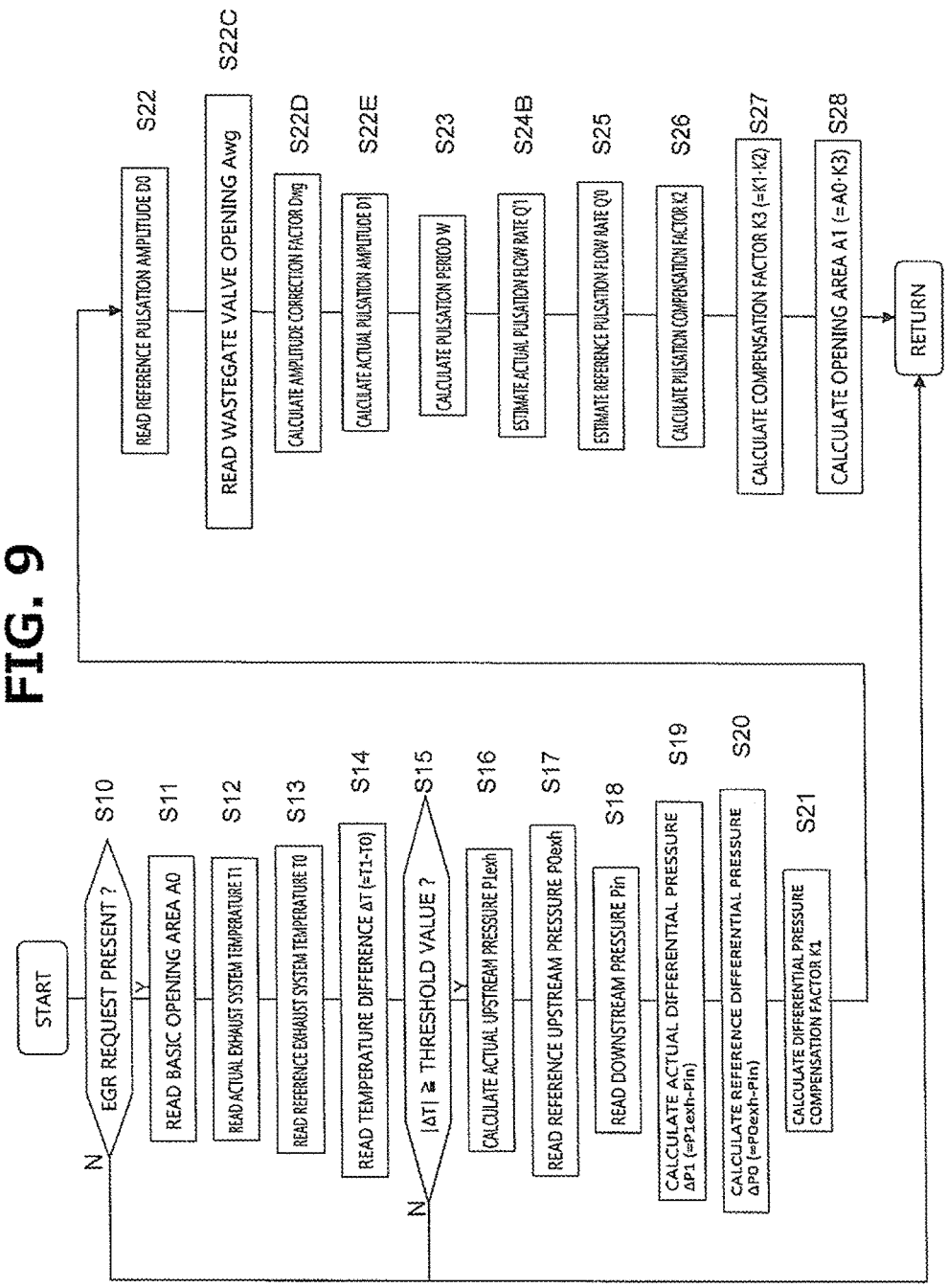
FIG. 9 is a flow chart showing a flow of control for correcting the opening of the EGR control valve, according to a third embodiment of the present embodiment.

FIG. 9 is a flow chart showing a flow of control for correcting the basic opening area A0 of EGR control valve 22, according to a third embodiment of the present embodiment. For further enhancement of accuracy of the correction, the third embodiment is configured to correct the reference pulsation amplitude D0 based on an opening Awg of wastegate valve 17, to obtain the actual pulsation amplitude D1 that is an amplitude of pulsation of differential pressure $\Delta P1$.

Specifically, with reference to the flow chart of FIG. 9, the operations of Steps S10 to S22 are the same as in the first embodiment. Subsequent to Step S22, at Step S22C, control section 40 reads opening Awg of wastegate valve 17. Subsequently, at Step S22D, control section 40 calculates amplitude correction factor Dwg based on opening Awg of wastegate valve 17. At Step S22E, control section 40 calculates the current actual pulsation amplitude D1, based on reference pulsation amplitude D0 and amplitude correction factor Dwg. Specifically, the actual pulsation amplitude D1 is obtained by multiplying the reference pulsation amplitude D0 by amplitude correction factor Dwg. At Step S23, control section 40 calculates pulsation period W of the differential pressure as in the first embodiment. Then, at Step S246, control section 40 calculates actual pulsation flow rate Q'1 of EGR gas, based on pulsation period W, actual pulsation amplitude D1, and differential pressure $\Delta P1$. The operations of the following Step S25 to S28 are the same as in the first embodiment.

According to the third embodiment described above, the feature of calculating the actual pulsation amplitude D1 by using the opening Awg of wastegate valve 17, and calculating the actual pulsation flow rate Q'1 and pulsation compensation factor K2 by using the actual pulsation amplitude D1, serves to further enhance the accuracy of the correction as compared to the first embodiment.

Figure 10:
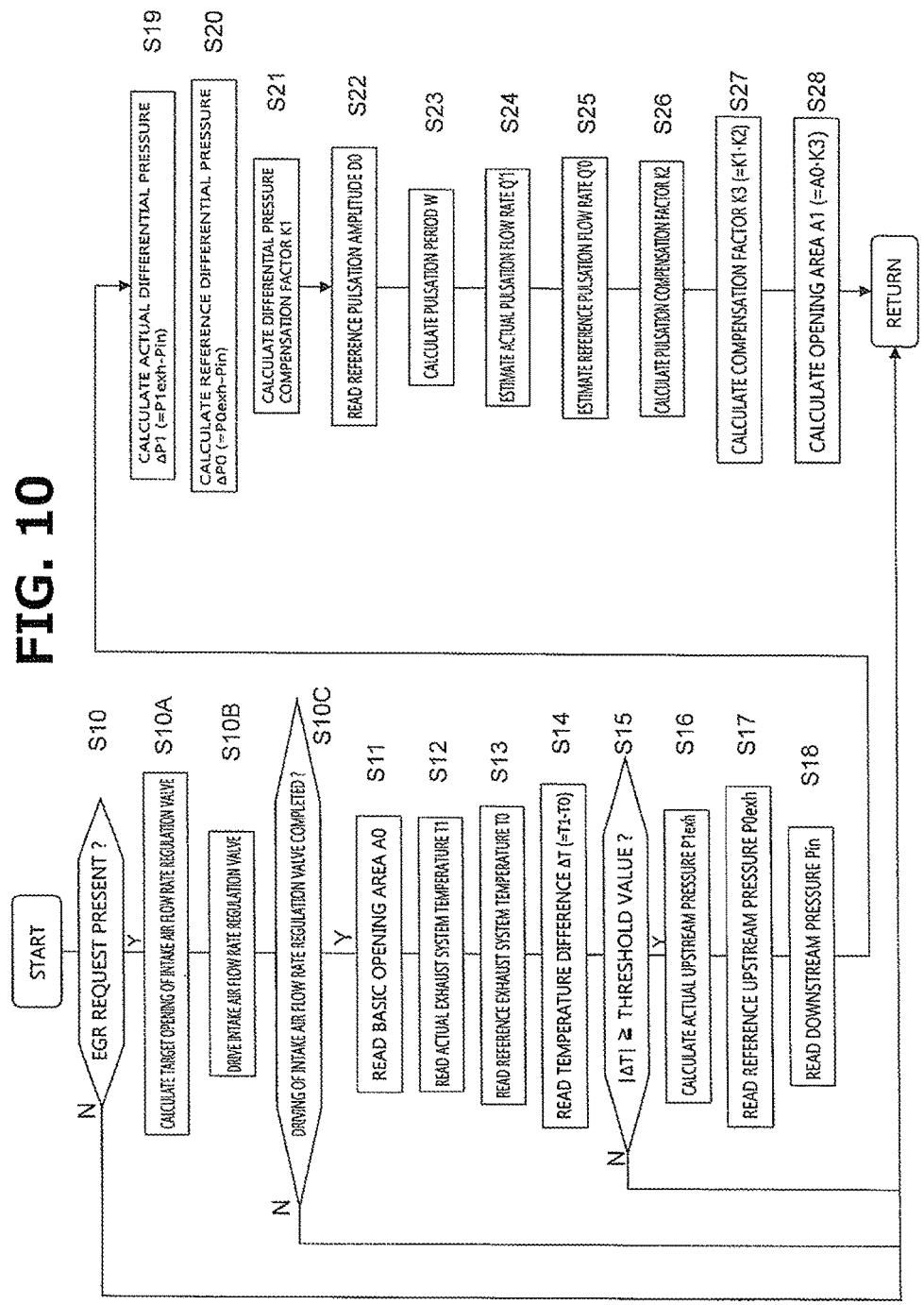
FIG. 10 is a flow chart showing a flow of control for correcting the opening of the EGR control valve, according to a fourth embodiment of the present embodiment.

FIG. 10 is a flow chart showing a flow of control for correcting the basic opening area A0 of EGR control valve 22, according to a fourth embodiment of the present embodiment. When an EGR request is present, the quantity of fresh air is reduced by throttling of intake air flow rate regulation valve 24, depending on the EGR rate (or the opening (opening degree) or opening area of EGR control valve 22), wherein intake air flow rate regulation valve 24 is disposed in the part of intake passage 13 upstream of EGR passage 21. The fourth embodiment is configured to await a condition where driving of intake air flow rate regulation valve 24 in the closing direction is completed to actually allow entrance of the EGR gas, and thereafter perform the same control as in the first embodiment.

Specifically, with reference to the flow chart of FIG. 10, when determining at Step S10 that an EGR request is present, control section 40 proceeds to Step S10A where control section 40 sets the target opening of intake air flow rate regulation valve 24. This target opening is set to a value in the closing direction, for reduction of the quantity of fresh air depending on the EGR rate.

At Step S10B, control section 40 controls driving of intake air flow rate regulation valve 24 to the target opening. At Step S10C, control section 40 determines whether or not driving of intake air flow rate regulation valve 24 to the target opening is completed. This determination may be implemented by simply determining whether or not a predetermined time period has elapsed, wherein the predetermined time period corresponds to completion of the driving, or by directly sensing the condition by a sensor, or by estimating the condition based on the engine operation state. When determining that the driving of intake air flow rate regulation valve 24 is not completed, control section 40 terminates the present routine.

When determining that the driving of intake air flow rate regulation valve 24 is completed, control section 40 proceeds to Step S11. At Step S11, control section 40 sets and reads the basic opening area A0 of EGR control valve 22 corresponding to the basic opening (opening degree) of EGR control valve 22, wherein the basic opening area A0 is set based on engine rotational speed and engine load with reference to the prepared map for opening area setting, as in the first embodiment. The operations of the following Step S12 to S28 are the same as in the first embodiment.

According to the fourth embodiment described above, the feature of performing the control of correction of the opening area after completion of the driving of intake air flow rate regulation valve 24, serves to reliably prevent a situation where an excessive quantity of EGR gas enters the intake passage 13 before reduction of the quantity of fresh air.

The following lists characteristic configurations, operations, and effects of the embodiments described above.

<1> It includes: setting a basic opening (basic opening area A0) of the EGR control valve 22, based on a current engine operation state; calculating a differential pressure ΔP1 across the EGR control valve 22, based on an actual exhaust system temperature T1; calculating a reference differential pressure ΔP0 that is a differential pressure across the EGR control valve 22 in a steady state corresponding to the current engine operation state; calculating a reference pulsation amplitude D0 that is an amplitude of pulsation of the reference differential pressure ΔP0; calculating a pulsation compensation factor K2, based on the differential pressure ΔP1, the reference differential pressure ΔP0, and the reference pulsation amplitude D0; and correcting the basic opening (A0) by using the pulsation compensation factor K2, as shown in the following equation (5)'.

$$K2 = [\int\{(\Delta P0 + D0 \times \sin(\omega t))^{1/2}\}dt / \int\{(\Delta P1 + D0 \times \sin(\omega t))^{1/2}\}dt] \quad (5)'$$

In other words, it calculates the pulsation compensation factor K2 such that an actual pulsation flow rate Q'1 is equal to a reference pulsation flow rate Q'0, wherein the actual pulsation flow rate Q'1 is determined in consideration of pulsation of the differential pressure ΔP1 as shown in the following equation (3)', and wherein the reference pulsation flow rate Q'0 is determined in consideration of pulsation of the reference differential pressure ΔP0.

$$Q'1 = 1/W \times \int\{A1 \times C \times (\Delta P1 + D0 \times \sin(\omega t))^{1/2}\}dt \quad (3)'$$

$$Q'0 = 1/W \times \int\{A0 \times C \times (\Delta P0 + D0 \times \sin(\omega t))^{1/2}\}dt \quad (4)$$

As described above with reference to FIG. 6, in the state of thermal non-equilibrium, actual flow rate Q1 deviates from reference flow rate Q0 in this specific manner under influence of pulsation of the differential pressure, but the feature of correcting the basic opening area A0 by using the pulsation compensation factor K2, serves to suppress variation of the flow rate of EGR gas from being caused by pulsation of the differential pressure in the state of thermal non-equilibrium, and thereby accurately correct the opening (opening area) of EGR control valve 22.

<2> Preferably, it includes: calculating the pulsation compensation factor such that the actual pulsation flow rate is equal to a reference pulsation flow rate, wherein the actual pulsation flow rate is an average flow rate of EGR gas per period of pulsation of the differential pressure, and wherein the reference pulsation flow rate is an average flow rate of EGR gas per period of pulsation of the reference differential pressure; and correcting the basic opening by using the pulsation compensation factor.

<3> It further includes: calculating a differential pressure compensation factor K1 such that a flow rate of EGR gas at the actual exhaust system temperature T1 is equal to a flow rate of EGR gas in the steady state; and correcting the basic opening (basic opening area A0) by using the differential pressure compensation factor K1. This serves to enhance the accuracy of correction by suppressing the accuracy of control from being adversely affected by deviation between the differential pressure ΔP1 and the reference differential pressure ΔP0 in the state of thermal non-equilibrium.

<4> Preferably, it includes: calculating a reference exhaust system temperature T0 that is a temperature of the exhaust system in the steady state corresponding to the current engine operation state; and correcting the basic opening in response to a condition that a temperature difference ΔT between the actual exhaust system temperature T1 and the reference exhaust system temperature T0 is greater than or equal to a predetermined threshold value.

<5> In the second embodiment shown in FIG. 8, for enhancement of accuracy of the correction, it includes: calculating an actual pulsation amplitude D1, based on the reference pulsation amplitude D0 and the temperature difference ΔT between the actual exhaust system temperature and the reference exhaust system temperature (see Steps S22A and S22B); and calculating the pulsation compensation factor K2 by using the actual pulsation amplitude (D1), as shown in equation (5).

<6> In the third embodiment shown in FIG. 9, for enhancement of accuracy of the correction, it includes:

calculating an actual pulsation amplitude D1, based on the reference pulsation amplitude D0 and an opening Awg of a wastegate valve 17 (see Steps S22C to S22E); and calculating the pulsation compensation factor K2 by using the actual pulsation amplitude D1, as shown in equation (5).

<7> In the fourth embodiment shown in FIG. 10, as shown at Steps S10 and S10A to 10C, it includes: driving an intake air flow rate regulation valve 24 in a closing direction, in response to presence of a request for EGR, wherein the intake air flow rate regulation valve 24 is disposed in a part of the intake passage 13 upstream of a place where the EGR passage 21 is connected to the intake passage 13; and performing the correcting control, namely, performing introduction of EGR gas, after completion of the driving of the intake air flow rate regulation valve 24 in the closing direction such that the quantity of fresh intake air is throttled.

<8> By application of the correcting control described above, the basic opening (opening area) of the EGR control valve 22 is corrected by increasing the basic opening (opening area) in response to vehicle acceleration. At acceleration, especially, at an initial stage of acceleration, this serves to increase the actual EGR rate to be close to the target EGR rate, and thereby suppress the response of the EGR rate from being delayed, as shown in FIG. 7A.

<9> On the other hand, the basic opening of the EGR control valve 22 is corrected by reducing the basic opening in response to vehicle deceleration. At deceleration, especially, at an initial stage of deceleration, this serves to reduce the actual EGR rate to be close to the target EGR rate, and thereby suppress the EGR rate from overshooting, as shown in FIG. 7B.

Although the present invention has been described above with reference to the specific embodiments, the present invention is not limited to the embodiments, but includes various variations and modifications. For example, the present invention is applied to an engine provided with a turbocharger in the embodiments, but may be applied to a normally aspirated engine provided with no turbocharger.

The invention claimed is:

1. An engine control method comprising:
   opening and closing an EGR passage by an EGR control valve, wherein the EGR passage is configured to recirculate a part of exhaust gas from an exhaust passage to an intake passage;
   setting a basic opening of the EGR control valve, based on a current engine operation state;
   sensing an actual exhaust system temperature that is a current temperature of an exhaust system;
   calculating a differential pressure across the EGR control valve, based on the actual exhaust system temperature;
   calculating a reference differential pressure that is a differential pressure across the EGR control valve in a steady state corresponding to the current engine operation state;
   calculating a reference pulsation amplitude that is an amplitude of pulsation of the reference differential pressure; and
   correcting the basic opening, based on the differential pressure, the reference differential pressure, and the reference pulsation amplitude.

2. The engine control method as claimed in claim 1, comprising:
   calculating a pulsation compensation factor such that an actual pulsation flow rate is equal to a reference pulsation flow rate, wherein the actual pulsation flow rate is an average flow rate of EGR gas per period of pulsation of the differential pressure, and wherein the reference pulsation flow rate is an average flow rate of EGR gas per period of pulsation of the reference differential pressure; and
   correcting the basic opening by using the pulsation compensation factor.

3. The engine control method as claimed in claim 1, comprising:
   calculating a differential pressure compensation factor such that a flow rate of EGR gas at the actual exhaust system temperature is equal to a flow rate of EGR gas in the steady state; and
   correcting the basic opening by using the differential pressure compensation factor.

4. The engine control method as claimed in claim 1, comprising:
   calculating a reference exhaust system temperature that is a temperature of the exhaust system in the steady state corresponding to the current engine operation state; and
   correcting the basic opening in response to a condition that a temperature difference between the actual exhaust system temperature and the reference exhaust system temperature is greater than or equal to a predetermined threshold value.

5. The engine control method as claimed in claim 2, comprising:
   calculating a reference exhaust system temperature that is a temperature of the exhaust system in the steady state corresponding to the current engine operation state;
   calculating an actual pulsation amplitude, based on the reference pulsation amplitude and the temperature difference between the actual exhaust system temperature and the reference exhaust system temperature, wherein the actual pulsation amplitude is an amplitude of pulsation of the differential pressure; and
   calculating the pulsation compensation factor, based on the differential pressure, the reference differential pressure, the actual pulsation amplitude, and the reference pulsation amplitude.

6. The engine control method as claimed in claim 2, with a turbocharger for supercharging intake air, and a wastegate valve for regulating a boost pressure supplied by the turbocharger, the engine control method comprising:
   calculating an actual pulsation amplitude, based on the reference pulsation amplitude and an opening of the wastegate valve, wherein the actual pulsation amplitude is an amplitude of pulsation of the differential pressure; and
   calculating the pulsation compensation factor, based on the differential pressure, the reference differential pressure, the actual pulsation amplitude, and the reference pulsation amplitude.

7. The engine control method as claimed in claim 1, with an intake air flow rate regulation valve disposed in a part of the intake passage upstream of a place where the EGR passage is connected to the intake passage, the engine control method comprising:
   driving the intake air flow rate regulation valve in a closing direction, in response to presence of a request for EGR; and
   correcting the basic opening, after completion of the driving of the intake air flow rate regulation valve in the closing direction.

8. The engine control method as claimed in claim 1, comprising correcting the basic opening by increasing the basic opening in response to vehicle acceleration.

9. The engine control method as claimed in claim 1, comprising correcting the basic opening by reducing the basic opening in response to vehicle deceleration.

10. An engine control device comprising:
- an EGR passage configured to recirculate a part of exhaust gas from an exhaust passage to an intake passage;
- an EGR control valve configured to open and close the EGR passage;
- a basic opening setting part configured to set a basic opening of the EGR control valve, based on a current engine operation state;
- an actual exhaust system temperature sensing part configured to sense an exhaust system temperature;
- a differential pressure calculating part configured to calculate a differential pressure across the EGR control valve, based on an actual exhaust system temperature sensed by the actual exhaust system temperature sensing part;
- a reference differential pressure calculating part configured to calculate a reference differential pressure that is a differential pressure across the EGR control valve in a steady state corresponding to the current engine operation state;
- a reference pulsation amplitude calculating part configured to calculate a reference pulsation amplitude that is an amplitude of pulsation of the reference differential pressure; and
- a correcting part configured to correct the basic opening, based on the differential pressure, the reference differential pressure, and the reference pulsation amplitude.

* * * * *